United States Patent [19]

Lebouc

[11] 4,265,011

[45] May 5, 1981

[54] REMOTE-CONTROLLED SCREWING DEVICE

[75] Inventor: Bernard Lebouc, Dinan, France

[73] Assignee: Framatome, Courbevoie, France

[21] Appl. No.: 974,508

[22] Filed: Dec. 28, 1978

[30] Foreign Application Priority Data

Jan. 30, 1978 [FR] France .................................. 7802506

[51] Int. Cl.³ ......................... B23P 15/26; B23P 19/04
[52] U.S. Cl. ......................................... 29/720; 29/240;
29/723; 29/726
[58] Field of Search ................ 29/157.3 R, 157.4, 240,
29/407, 720, 721, 723, 726; 81/57.16, 57.24,
57.35, 57.4; 122/379; 165/11, 76

[56] References Cited

U.S. PATENT DOCUMENTS

| 3,872,565 | 3/1975 | Ritz et al. ................................. 29/723 |
| 4,074,814 | 2/1978 | Cooper et al. ...................... 165/76 X |
| 4,168,782 | 9/1979 | Sturges ............................... 165/76 X |

FOREIGN PATENT DOCUMENTS

774957 12/1934 France ........................................ 29/240

227997 7/1943 Switzerland .............................. 29/240

*Primary Examiner*—Ervin M. Combs
*Attorney, Agent, or Firm*—Haseltine and Lake

[57] ABSTRACT

Apparatus for use in screwing a cover onto an annular bearing seat provided at the circumference of a circular orifice, the cover being provided with a circle of screws to be engaged in threaded bores in the bearing seat, comprises a screwing device comprising an arm pivotable about the axis of a pivot mounted on a support plate to be fixed to the cover, the arm extending perpendicular to the axis of the pivot which extends perpendicular to the plane of the bearing seat, a screwing head mounted on the end of the arm and carrying a screw key for engaging and rotating the screws, and which is movable axially between an operative position engaging a screw and an inoperative position clear of the screw and permitting the arm to rotate to bring the screw key into alignment with another screw, and drive means for rotating the arm, for rotating the screw key and for moving the screw key axially, a remote control console for controlling the drive means, and a television circuit for remote observation of operation of the device.

4 Claims, 5 Drawing Figures

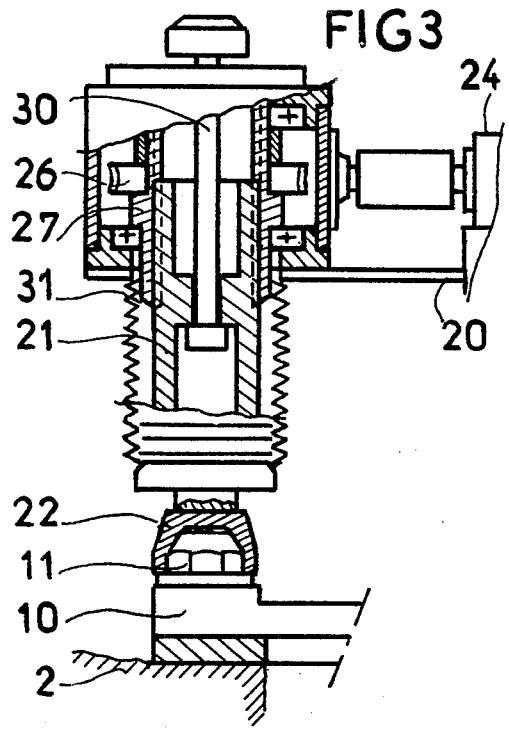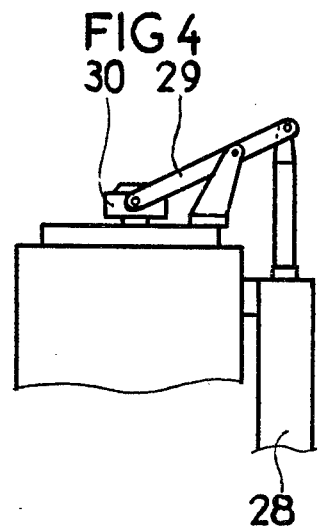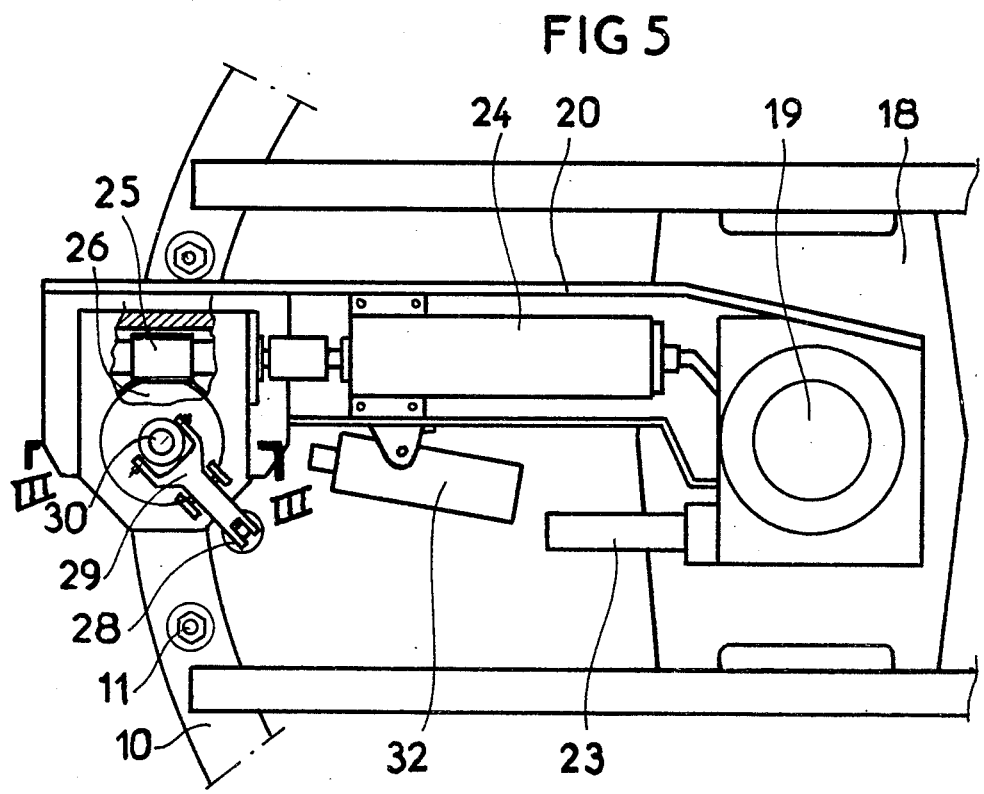

REMOTE-CONTROLLED SCREWING DEVICE

The invention relates to apparatus which is intended for screwing a cover onto an annular bearing seat provided over the circumference of a circular orifice.

The invention is designed particularly, but not exclusively for the rapid screwing of a sealing cover for an orifice which is located in an enclosure where it can be dangerous or inconvenient to remain for too long a time.

This is the case when the orifice to be sealed is located in a steam generator of a nuclear power station and constitutes the orifice through which the piping for the circulation of the primary fluid opens. Reference can be made, for example, to French Patent Application Ser. No. 76/03,456 which describes a sealing device for an orifice of this kind.

In power stations and especially nuclear power stations, the energy is produced from a primary fluid heated inside the reactor. This fluid, for example water under pressure, gives up its heat to a secondary fluid which is vaporised, and the vapour thus produced serves to drive a turbo-alternator unit for the production of electrical energy. The heat exchanger or vapour generator consists of a cylindrical enclosure containing a nest of tubes for the circulation of the primary fluid the secondary fluid bathing the outside of the tubes and heating up in contact therewith.

The enclosure is generally cylindrical and the tubes are U-shaped, mounted on a tube plate and open out into a hemispherical base separated into two chambers by means of a partition; the primary fluid arrives in one chamber on one side of the partition and leaves through the other.

The two chambers of the generator base are therefore connected to pipes for feeding and discharging the primary fluid by means of tubes provided with orifices of large diameter.

For checking or maintenance purposes, it is periodically necessary to have access to the inside of the generator base. An access orifice is therefore provided in order to permit the passage of a man equipped with a suit for protection against radiation. Of course, the time for which the operator remains in the generator base must be restricted to a minimum. During this operation, the circuit for the circulation of the primary fluid is closed in order to avoid any danger of the inopportune arrival of water in the generator base. The orifice through which the piping for the primary fluid opens out is of large diameter and the danger of the operator, or simply tools, falling into the piping must also be avoided. Furthermore, this open orifice constitutes a psychological hindrance, and so it is essential to seal it as soon as possible after an operator has entered the inside of the generator base.

As soon as the operator has entered the base, he therefore positions a cover over the orifice of the primary fluid pipe. A cover of this kind has been described in detail in French Patent Application Ser. No. 76/03,456. As the diameter of the access orifice is as small as possible, the sealing cover is provided with screws which can engage in threaded bores in the bearing seat for the cover. Each screw is fixed to the cover by a connecting means which allows the screw to rotate. The cover described in French Patent Application Ser. No. 76/03,456 can be introduced and positioned on the bearing seat in a very short time, namely of the order of a few minutes. However, the residence time of the operator is then prolonged by the time required to tighten the numerous screws which hold the cover on its bearing seat.

It is an object of the invention to overcome this disadvantage and to provide an apparatus which makes it possible to tighten the screws for locking the cover on the bearing seat, without it being necessary for the operator to remain inside the generator base.

According to one aspect of the invention there is provided an assembly for screwing, inside an enclosure, a sealing cover, for a circular orifice, onto an annular bearing seat which is provided at the circumference of the orifice and possesses threaded bores arranged in a circle, the cover being provided with fixing screws arranged in a circle and which are engageable in the bores, the assembly comprising a screwing device comprising a support plate provided with means for fixing it to the cover and a pivot arranged so that, in use, its axis extends perpendicular to the plane of the bearing seat, an arm which is pivotable about the axis of the pivot and extends perpendicular to the pivot, a screwing head at the end of the arm, arranged with its axis perpendicular to the arm and so that, in use, its axis is perpendicular to the plane of the bearing seat and intersects the circle of the screws, and which is provided with a rotating screw key which is moveable in the direction of the axis of its screwing head, drive means for rotating the arm about the pivot, drive means for rotating the screw key, and drive means for moving the screw key in the direction of the axis of the screwing head, a console for the remote control of the drive means, and means for observing operation of the screwing device, which comprises a television circuit with a camera which is carried by the arm and of which the axis of sight is orientated towards the screw key, and a monitoring screen located near the console.

Preferably, the observation means also comprises a listening device including a microphone placed in the enclosure and a loudspeaker located near the console.

A coupling system including a cardan joint is preferably provided in the screwing head in order to permit deflection of the key.

According to another aspect of the invention there is provided a process for screwing up the sealing cover, using apparatus as described above, the process comprising the following successive stages: manually introducing and positioning the cover on the bearing seat of the orifice, manually engaging, over only a fraction of a turn, the fixing screws in the threaded bores, manually introducing and positioning the support plate of the screwing device on the cover, and successively tightening all the screws from the control console, with visual monitoring of the operations on the screen.

The invention will now be described in greater detail, with reference to an embodiment thereof, given by way of example only, and illustrated in the accompanying drawings.

In the drawings:

FIG. 3 is a partial axial section of the screwing head of FIG. 2 on the line III—III of FIG. 5;

FIG. 4 shows a detail of the means for moving the screw key axially; and

FIG. 5 is a top view, with a partial section, of the screwing device of FIG. 2.

Figure 1:
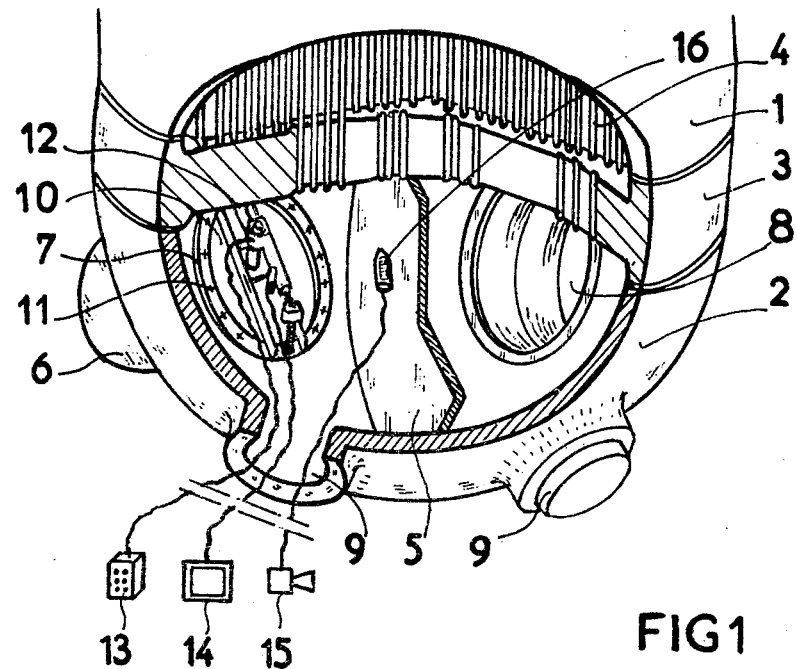
FIG. 1 shows, in perspective and in a simplified manner, a vapour generator base in which a sealing cover is in the process of being screwed over the orifice of a primary fluid pipe.
Figure 2:
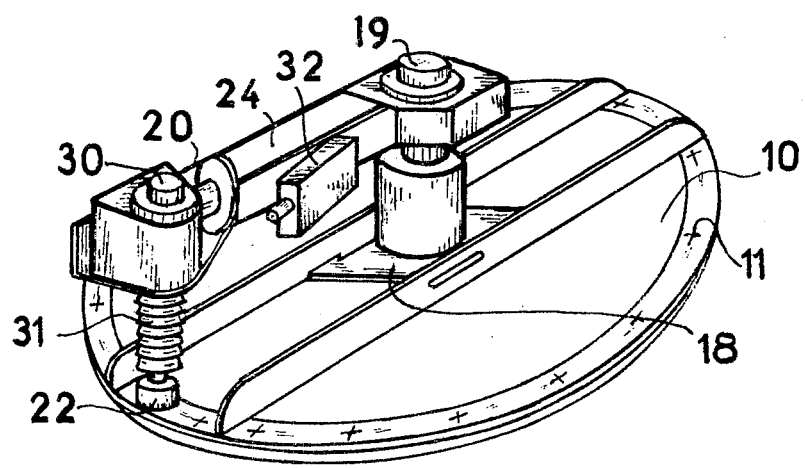
FIG. 2 shows, in simplified perspective, an embodiment of apparatus according to the invention, the screwing device thereof being positioned on a cover seated on an annular bearing seat.

As shown in FIG. 1, the vapour generator comprises a cylindrical enclosure 1 closed by a hemispherical base 2. A tube plate 3, to which the tubes 4 are fixed, is placed between the enclosure 1 and the base 2. The base 2 is divided into two chambers by means of a partition 5.

The primary fluid, which is heated in the reactor, is supplied to one of the chambers through a tube 6 which opens into the base 2 through an orifice 7. It passes into the tubes 4 and, after having given up its heat to the secondary fluid, enters the other chamber in the base 2, on the other side of the wall 5, and it then leaves the generator through the orifice 8 of a tube for returning the fluid to the reactor.

For checking and maintaining the primary fluid circuit, the base 2 is provided with two access orifices 9 which are placed one on each side of the partition 5, and through which an operator can enter the chambers in the base 2.

A sealing cover 10, which is positioned manually over the orifice 7, is provided with screws 11 arranged in a circle and which are engaged in a circle of threaded bores in an annular bearing seat provided at the circumference of the orifice 7. A screwing device 12 is positioned manually on the central part of the cover 10.

A console 13 outside the generator, for controlling the screwing device 12, and also a monitoring screen 14 and a loudspeaker 15, which make it possible to monitor the operation, have been shown schematically. The screen 14 is connected to a television camera carried by the screwing device, and the loudspeaker 15 is connected to a microphone 16 placed in the base of the generator.

FIGS. 2 to 5 show, in more detail, the device in position on an annular bearing seat in which uniformly spaced screws 11 are engaged. A support plate 18 is fixed by quick-acting means to the cover 10. The plate 18 comprises a pivot 19 the axis of which is perpendicular to the plane of the bearing seat and hence perpendicular to the plane of the ring of the cover which bears on this seat.

An arm 20 is articulated on the pivot 19, perpendicular to the latter. The end portion of arm 20 can describe a circle, the radius of which is equal to that of the circle of screws. The end portion of the arm 20 carries a screwing head, the axis of which is perpendicular to the arm and to the plane of the circle of screws and intersects the circle of the screws. The head comprises a rotating key 21 which is provided with an end socket 22 and is movable in the direction of the axis of the screwing head. A cardan joint may be placed between the key 21 and the socket 22 in order to compensate slight differences in alignment.

The arm 20 is caused to rotate about the pivot 19 by means of a pneumatic motor 23 and a worm gear inside the pivot.

The key 21 is caused to rotate by means of a pneumatic motor 24 which is carried by the arm 20 and is supported from the pivot 19 via rotating joints. The motion is transmitted by a screw coupling 25 engaging with a wheel 26 which is integral or fast with an internally grooved sleeve 27.

The key 21 is slidable in the axial direction of the screwing head in the grooves in the sleeve 27 between a position for tightening a screw 11, as shown in FIG. 3, and a retracted position in which the arm 20 can rotate about pivot 19 to a position above another screw. The key 21 is moved axially by a jack 28 connected to a rocker lever 29 which is articulated on the end of a control rod 30 (FIG. 4). Bellows 31 protect the telescopic part of the screwing head.

Television camera 32, of which the axis of sight is orientated towards the sockets 22, is fixed to the side of the arm 20. This camera is linked to the monitoring screen 14 outside the enclosure. During the screwing operation, it is therefore possible to observe the movements of the arm and the key on the screen.

Microphone 16 is also placed near the arm and is connected to the loudspeaker 15 which is located near the screen so that the operator has available to him a listening device which makes it possible to follow the operation of the motors aurally.

The console 13, adjacent the monitoring screen and the loudspeaker, possessing the buttons or the like for controlling the screwing device. It possesses a control for gradually rotating the arm 20 in both directions, a control for gradually rotating the key 21 in both directions and a control for raising and lowering the key 21.

In order to seal the orifice of a pipe in the primary circuit, the operator enters the chamber in the generator base through orifice 9 and manually positions the cover 10 on the annular seat surrounding the orifice. He manually engages each of the screws 11 in the threaded bores in the seat, but he need only engage them over a fraction of a turn, without going as far as locking or even complete tightening. Also manually, he then positions the support plate 18 and the screwing device on the cover and he arranges a microphone in the enclosure, near the screwing device. These operations can be carried out in a very short time and he can leave the base immediately.

Having taken up his position in front of the console and the monitoring screen, he tightens the screws using the controls located on the console. The tightening sequences are directed by the picture on the screen and also by the sound coming from the loudspeaker. In order to facilitate the work of the operator, the cover can possess visible guide-marks in front of the screws.

The invention therefore permits a more rapid positioning of the cover, less immobilisation of the installation and a reduced residence time of the operator in the vapour generator.

The above described screwing device is preferably made of light alloys so that it is neither too heavy nor too bulky.

The motorisation of the device is pneumatic; the only electrical connections are those from the devices for observation by means of the television camera and the microphone.

Of course, the invention is not limited to the details of the embodiment which has now been described by way of example, but it also embraces those embodiments which only differ therefrom in details, in methods of carrying out the process or in the use of equivalent means. Thus, the motorisation could be hydraulic rather than pneumatic. It would also be possible not to use a microphone or a loudspeaker, visual monitoring on the screen being sufficient.

Moreover, the invention which has been described in the particular case of a vapour generator can also be used in other situations, each time a cover must be screwed onto a bearing seat around an orifice, in an enclosure where it is dangerous or inconvenient to remain for a long time.

What is claimed is:

1. A screw fastening apparatus for fastening screws of a sealing cover for a circular orifice within a nuclear steam generator, onto an annular bearing seat disposed at the circumference of the orifice and having threaded bores arranged in a circle, the cover being provided with fixed screws arranged in a circle and which are engageable in the bores, wherein:

there is provided a support plate;

said support plate being adapted to be affixed to the cover;

a pivot defining an axis and being mounted on said support plate whereby said axis is perpendicularly extendable to the plane of the bearing seat;

an arm pivotable about said pivot axis, and extending perpendicular thereto;

a screwing head at the end of said arm, having an axis perpendicular to said arm and arranged whereby the axis thereof is perpendicular to the plane of the bearing seat and intersects the circle of the screws;

a screw key mounted on said screwing head for movement in the direction of said axis of said screwing head;

drive means for rotating said arm about said pivot;

drive means for rotating said screw key about said axis of said screwing head;

drive means for moving said screw key axially of said screwing head;

and a television circuit for observing operation of said screwing drive including a camera carried by said arm and arranged with its axis of sight orientated towards said screw key, and a monitoring screen for viewing said operation of said screwing device.

2. Apparatus according to claim 1, wherein: a listening device includes a microphone placed in the enclosure and a loudspeaker adjacent said console to permit an operator to aurally monitor said respective drive means.

3. Apparatus according to claim 1 or claim 2, wherein said screwing head comprises system means including a cardan joint, for permitting deflection of said screw key.

4. Apparatus according to claim 1, wherein said drive means are pneumatic.

* * * * *